United States Patent [19]
Stoltzfus et al.

[11] 3,834,768
[45] Sept. 10, 1974

[54] DISTRIBUTOR HEAD FOR SILO FILL PIPE

[75] Inventors: Henry S. Stoltzfus, Mount Joy; John S. Stoltzfus, Lancaster, both of Pa.

[73] Assignee: Lancaster Level-Flo Inc., Lancaster, Pa.

[22] Filed: Apr. 6, 1972

[21] Appl. No.: 241,511

Related U.S. Application Data

[63] Continuation-in-part of Ser. No. 166,055, July 26, 1971, abandoned.

[52] U.S. Cl. .............................. 302/60, 214/17 C
[51] Int. Cl. ...................... B65g 53/52, B65g 53/42
[58] Field of Search ........ 214/17 C; 302/10, 60, 61, 302/37

[56] References Cited
UNITED STATES PATENTS

| | | | |
|---|---|---|---|
| 1,787,261 | 12/1930 | Reinke | 302/60 |
| 1,957,309 | 5/1934 | Armour | 302/37 X |
| 2,650,136 | 8/1953 | Raleigh | 302/60 |
| 3,321,252 | 5/1967 | Dreier | 302/60 |
| 3,618,798 | 11/1971 | Dreier | 302/60 X |
| 3,675,796 | 7/1972 | Atkinson et al. | 214/17 C |

FOREIGN PATENTS OR APPLICATIONS

| | | | |
|---|---|---|---|
| 888,787 | 2/1962 | Great Britain | 302/37 |
| 1,206,859 | 5/1958 | France | 302/37 |

*Primary Examiner*—Evon C. Blunk
*Assistant Examiner*—W. Scott Carson
*Attorney, Agent, or Firm*—C. Hercus Just

[57] ABSTRACT

A distributor head for attachment to the delivery end of a silo fill pipe and operable to spread and disperse a blown stream of silage material into a plurality of streams in a manner to spread the delivery evenly over substantially the entire cross-sectional area of a silo by means of curved deflector vanes and members attached to a base plate which is pivotally connected to bracket means on the outer end of a gooseneck shaped conduit of a silo fill pipe. The fill pipe also is provided with means to center the blown stream relative to said distributor head.

8 Claims, 11 Drawing Figures

PATENTED SEP 10 1974　　　　3,834,768
SHEET 1 OF 2
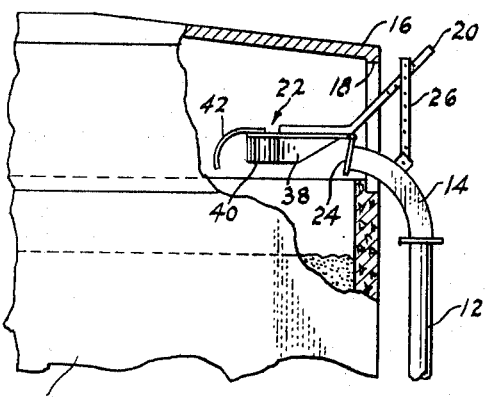
Fig. 1
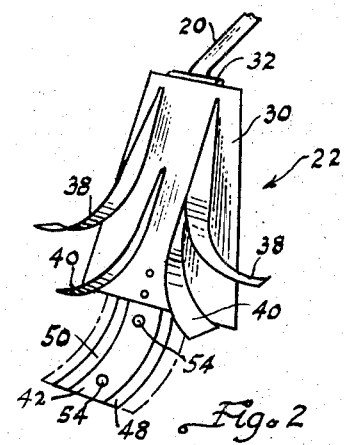
Fig. 2
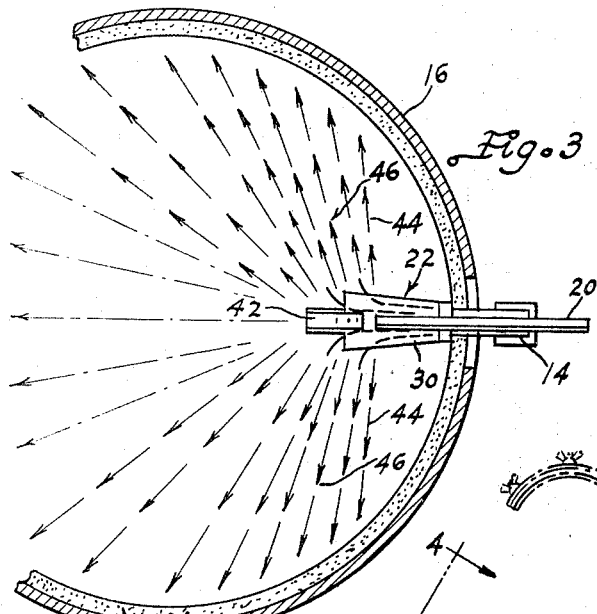
Fig. 3
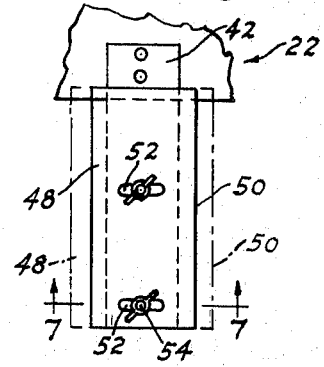
Fig. 4
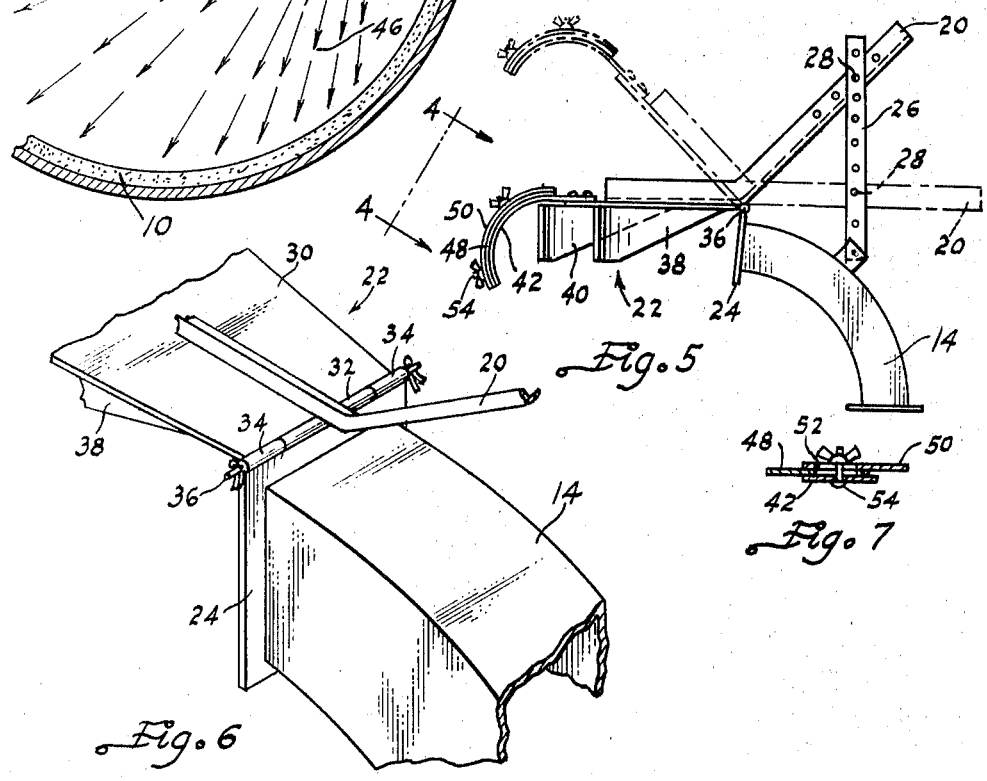
Fig. 5
Fig. 6
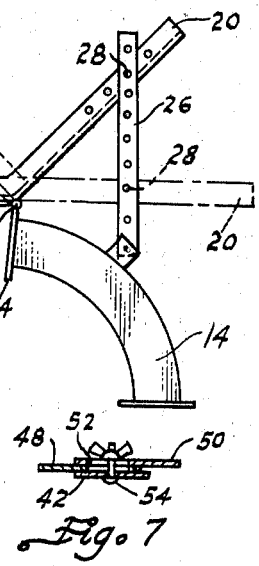
Fig. 7

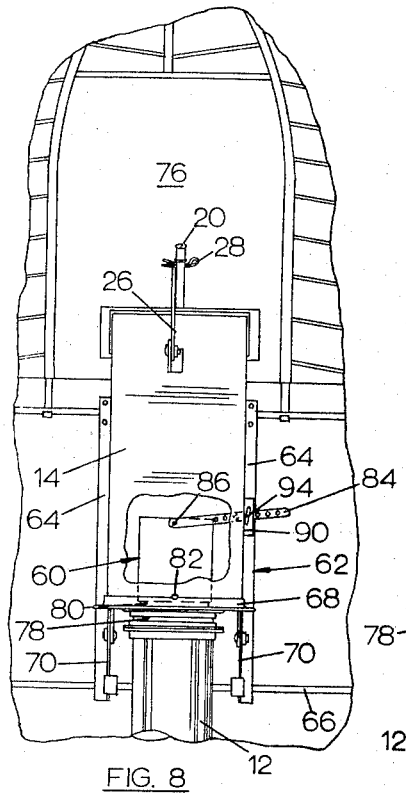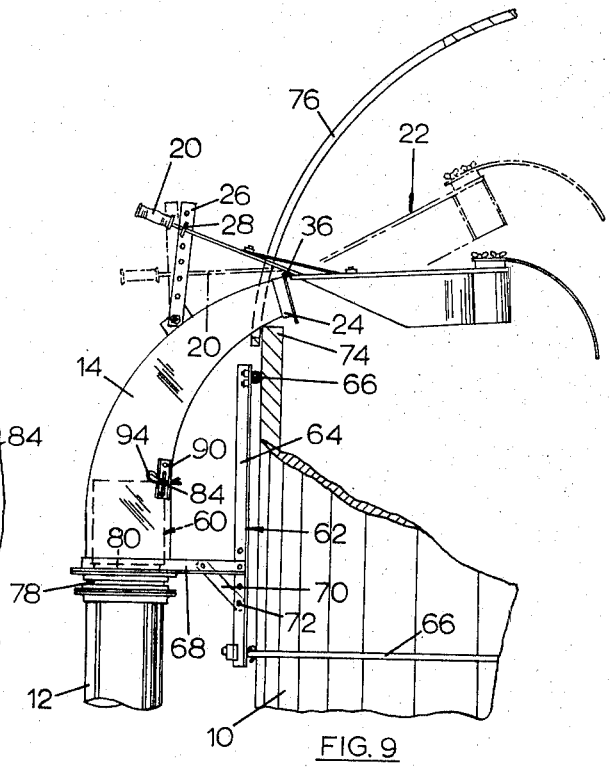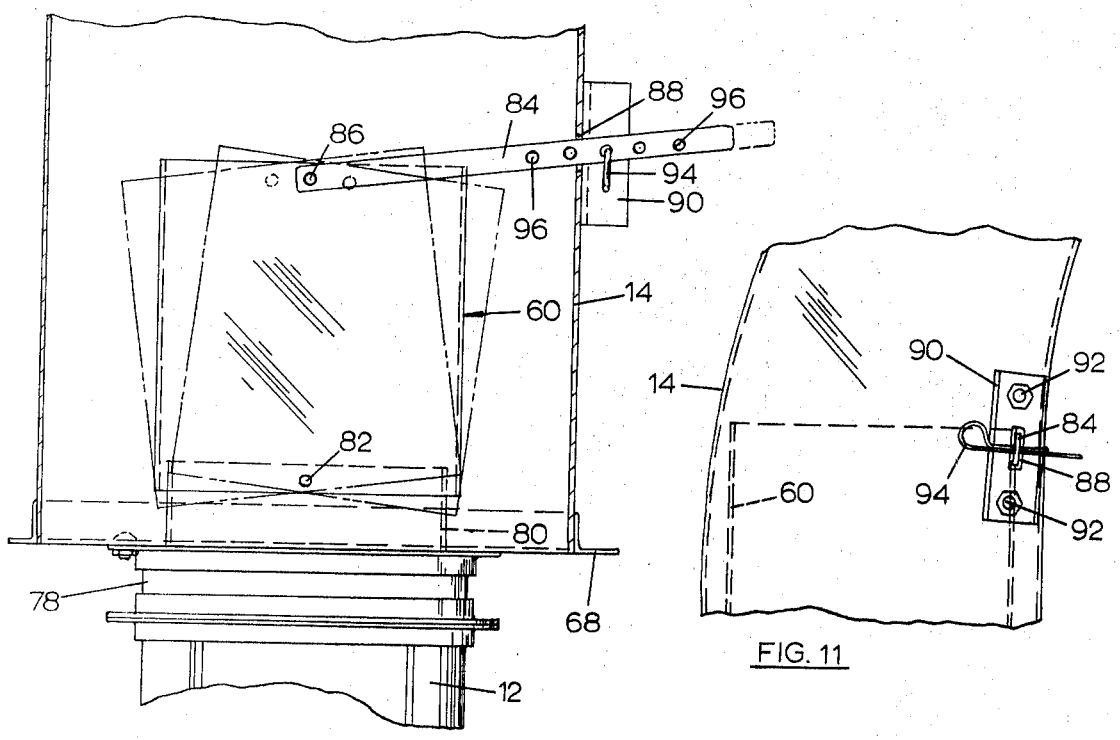

DISTRIBUTOR HEAD FOR SILO FILL PIPE

This application is a continuation-in-part of application Ser. No. 166,055, filed July 26, 1971, and now abandoned.

BACKGROUND OF THE INVENTION

Various means have been devised heretofore for spreading the stream of silage discharging from the outer end of the conventional gooseneck conduit mounted on the upper end of a silo fill pipe in attempts to effect relatively even loading and compacting of the silage material within the silo. More effective preservation of the silage and prevention of spoilage results from such even distribution of the silage within the silo when uniform compacting is produced. Certain of the means used at present and heretofore in attempts to effect such uniform distribution of the discharge silage have included power driven means to rotate a distributing head substantially about a vertical axis but such mechanism requires a certain amount of servicing and and repair and is much more complex than is required to achieve effective spreading.

Other devices have included various types of deflecting vanes which, to some extent, have been reasonably satisfactory, especially in regard to spreading material in silos of limited or relatively small diameters such as of the order of 10 or 15 feet. However, in current practice, especially in dairy farming, it is now common practice to utilize silos as much as 25 or 30 feet in diameter and of very substantial heights such as of the order of 60 or 75 feet or more. Under such circumstances, blowers of much greater power and effectiveness than heretofore used now are required to deliver silage up a vertical fill pipe to the top of such silo and, correspondingly, improvements are demanded in the distributing means attached to the upper ends of the fill pipe due to the inability of current types of distributing means to effect a desired amount of even distribution of the discharge silage over the entire area of such larger sizes of silos.

Included among the pertinent prior art are U.S. Pat. Nos. 2,650,136, issued Aug. 25, 1953 and 3,321,252, issued May 23, 1967. The structures disclosed in said patents either are restricted to a very limited number of paths into which the discharging stream is divided or the direction in which said paths extend is not suitable or adequate to effect a desired degree of even distribution, especially when used in conjunction with silos of relatively large diameter.

SUMMARY OF THE INVENTION

It is the principal object of the present invention to provide a silage distributor head which is of relatively simple construction and is provided with a suitable arrangement of curved deflecting vanes adapted to divide a relatively high volume single stream of silage discharged from a gooseneck shaped conduit into as many as seven streams, the majority of which fan outwardly from each other in a manner to provide a substantially even distribution of the silage over the entire cross-sectional area of even a larger diameter silo, one of the streams being deflected somewhat backwardly from the delivery direction so as to distribute material adjacent the wall of the silo which is nearest the fill pipe that is mounted on the exterior of the silo adjacent said wall.

Another object of the invention is to provide a plurality of pairs of outwardly curved deflecting vanes in conjunction with a central downwardly curved deflector, the opposite edges of which preferably are laterally adjustable to vary the width and consequently vary the streams which pass respectively between the edges of said central deflector and the adjacent pair of curved deflectors, as well as the same being deflected downwardly from said central deflector.

A further object of the invention is to provide suitable means to secure the desired adjustment of the width of said central deflector, said width being made variable by the provision of a pair of plates curved in complementary manner to the central deflector and being transversely slotted to receive clamping bolts supported by the central deflector and adapted to permit desired transverse adjustment of said plates in opposite directions relative to said central deflector.

Still another object of the invention is to provide adjustable means adjacent the upper end of the fill pipe operable to center the stream discharging from the fill pipe relative to the distributor head, whereby the vanes of said head can effectively and evenly spread and disperse said stream.

It is a still further object of the invention to provide durable and effective mounting means by which the gooseneck conduit is supported adjacent the upper end of a silo, said mounting means including adjustment features to insure accurate positioning of the discharge end of said gooseneck conduit relative to the fill opening of said silo.

Details of the foregoing objects and of the invention, as well as other objects thereof, are set forth in the following specification and illustrated in the accompany drawing comprising a part thereof.

BRIEF DESCRIPTION OF THE DRAWING

FIG. 1 is a fragmentary side elevation, partly in section, illustrating a portion of the top of a silo and showing a gooseneck shaped conduit to which a distributor head embodying the principles of the present invention is pivotally connected.

FIG. 2 is a fragmentary perspective view of the normally lower side of the silage distributor head embodying the principles of the present invention, shown on a larger scale than employed in FIG. 1.

FIG. 3 is a fragmentary plan view of the structure shown in FIG. 1 with the top of the silo removed to illustrate the distributing action of the silage distributor head comprising the present invention.

FIG. 4 is a fragmentary front end view, as seen on the line 4—4 of FIG. 5 and showing the width-adjustable means for the central deflector of the deflector head shown in the preceding figure.

FIG. 5 is a side elevation of the deflector head of the invention connected to an exemplary gooseneck shaped conduit and illustrating respectively in full lines and phantom two different relatively adjusted positions of the deflector head with respect to its supporting means.

FIG. 6 is a fragmentary perspective view showing exemplary pivot means for supporting the base plate of the distributor head comprising the present invention.

FIG. 7 is a detailed sectional view of the central deflector taken on the line 7—7 of FIG. 4.

FIG. 8 is a fragmentary vertical elevation of the upper end of a silo upon which a fill pipe and gooseneck conduit is mounted adjacent the fill opening therein, said gooseneck conduit being partially broken away to show details of adjustable discharge means comprising part of the present invention.

FIG. 9 is a fragmentary side elevation of the structure shown in FIG. 8.

FIG. 10 is an enlarged fragmentary portion of the structure of FIG. 8 and illustrating the adjustability of said discharge means in several exemplary positions illustrated in phantom.

FIG. 11 is a fragmentary side elevation of a limited part of the structure shown in FIG. 10.

DETAILED DESCRIPTION

Referring to FIGS. 1 and 3, an exemplary silo 10 and particularly the upper end thereof, is shown in fragmentary manner. The silo may be of any conventional construction, such as reinforced concrete, or otherwise. Connected to the wall of the silo adjacent one side thereof, by appropriate means, not shown, is a vertical fill pipe 12, the lower end of which conventionally is connectable to a power driven blower by which silage is delivered to the top of the fill pipe and discharges through a gooseneck shaped conduit 14. The top or dome 16 of the silo has a reclosable opening 18 therein, through which the conduit 14 extends, as well as a positioning bar 20 which is connected to the silage distributor head 22 comprising the present invention and extends therefrom at an angle to enhance the adjustable positioning of head 22.

The outer end of the gooseneck shaped conduit 14 is provided with a flange comprising a bracket 24 to which the distributor head 22 is pivotally connected at one end. The bar 20, which is fixed to the distributor head and extends angularly therefrom supports the same at desired adjusted pivoted positions by means of a locking bar 26 having a series of spaced holes therein through which a locking bolt 28 may be extended as well as through an appropriate hole in the positioning bar 20.

The distributor head 22 comprises part of the present invention and is relatively simple and preferably formed from sheet metal. It comprises a substantially flat base plate 30 of suitable size and width, the shape preferably being that of a trapezoid. One end of the plate 30 is provided with a tubular hinge member 32 which extends between a pair of hinged members 34 on the bracket 24, as shown in FIG. 6, through which a hinge pin 36 extends to effect pivotal connection of the base plate 30 to bracket 24.

What is normally the lower or undersurface of the plate 30, when in operative position, is provided with a first pair of deflector vanes 38 which are outermost relative to a second pair of deflector vanes 40. Both pairs of said deflector vanes 38 and 40 are connected rigidly along one edge, by welding or otherwise, to the base plate 30.

The first pair of deflector vanes extend substantially from the pivoted end of the base plate 30 and slightly diverge outwardly with respect to each other until about the mid-portion of the length thereof, whereupon the outer ends of the vanes 38 curve outwardly, away from each other, to dispose the terminal ends thereof beyond the outer side edge of the base plate 30 and substantially transverse to the longitudinal axis of the entire deflector head.

The second pair of deflector vanes 40 are also connected firmly to the base plate 30 such as by welding, and said vanes extend from substantially midway of the length of the plates 30 toward the end opposite the hinged end thereof. The outer ends of the vanes 40 terminate substantially adjacent said opposite end of the base plate 30 and said outer ends also curve perceptably away from each other but not laterally to the extent of the vanes 38.

A central deflector 42 also is connected at one end to said opposite end of the base plate 30 which is opposite the pivoted end thereof. The central deflector, as is best seen in FIG. 5, curves downwardly as viewed in FIG. 5 from base plate 30, particularly when in use, to a substantial extent. As a result of this arrangement, there actually are seven streams or paths of discharging material produced by the deflector head 22. The two outermost streams extend along the outer surfaces of the first pair of delfector vanes 38 and are discharged substantially transversely in opposite directions as indicated by the arrows 44.

Another pair of streams extend respectively between the pairs of first and second deflector vanes 38 and 40, these streams or paths being illustrated in exemplary manner by the arrows 46. A third pair of paths or streams extend between he second pair of deflector vanes 40 and the opposite edges of the central deflector 42. These are somewhat represented in exemplary manner by the arrows 48. Lastly, there will be a stream deflected downwardly and rearwardly toward the wall directly below the bracket 24 by reason of the curved configuration of the central deflector 42 as readily can be visualized from FIG. 5. The extent of such deflection will depend upon the angle at which the base plate 30 is disposed.

It also will be understood that the streams or paths of divided material referred to above are not compact or concise. This is because the type of material discharged from the gooseneck shaped conduit 14 is not of uniform consistency. Large and small pieces of material are in the stream as well as those of intermediate size. The specific gravity or weight of individual pieces is highly non-uniform, whereby the lighter pieces will not be blown or deflected as far as the heavier pieces for example. As a result, the actual operation of the device embodying the invention has been found to produce a substantially uniformly compact even layer of material across substantially the entire cross-section area of silos of even relatively large diameter. Accordingly, the exemplary overall pattern of arrows shown in FIG. 3 which represent paths of distribution of the material are generally realistic.

Depending upon the type of material and the force developed by the blower which discharges the material up the fill pipe 12, it is necessary to adjust the angle at which the distributor head 22 is positioned with respect to the discharge end of the gooseneck shaped conduit 14. Two exemplary positions of said head are illustrated respectively in full lines and in phantom in FIG. 5. As explained above, such adjusted positions are maintained by the locking bar 26 and the locking bolt 28 which engages the same. Usually such adjustment is made manually during the initial stage of filling a certain silo. During such filling operation, the silage produced is substantially uniform, whereby upon making a desired initial position setting of the distributor head 22, such setting normally will be satisfactory for either an entire filling operation or the entire discharge of a given load or quantity of silage material at any one time.

The present invention also provides a further improvement which primarily comprises a refinement. With reference to FIGS. 2, 4 and 7, it will be seen that the central deflector 42 is of a composite nature. The same is preferably formed from sheet metal of suitable thickness and width and the deflector 42 actually comprises a base member which supports a pair of similarly curved plated 48 and 50 which are substantially as long as the portion of the central deflector 42 which projects beyond the outer end of the base plate 30 of the deflector head 22.

As shown particularly in FIG. 4, the adjustable plates 48 and 50 are each provided with similar transversely extending slots 52 through which clamping bolts 54 extend and upon which wing nuts are threaded. Referring again to FIG. 4, it will be seen that the outer edges of the plates 48 and 50 are shown in full lines as extending slightly beyond the opposite edges of the central deflector 42. In phantom, a further extended position of the outer edges of the plates 48 and 50 is shown. To illustrate the laminated arrangement of the central deflector 42 and plates 48 and 50 in clear manner, attention is directed to FIG. 7 which is a sectional view taken on the line 7—7 of FIG. 4.

From the foregoing, it will be seen that the provision of the adjustable plates 48 and 50 on central deflector 42 will result in greater refinements in the distribution of material particularly in the direction of the side wall immediately below the bracket member 24. It also will affect the volume of the stream discharging between the side edges of the composite central deflector 42 and the inner surfaces of the second pair of deflector vanes 40.

It also will be seen, particularly from FIG. 5, that the outer edges of the deflector vanes 38 and 40, from the ends nearest the hinged end of base plate 30 and for approximately half the length thereof, are tapered toward the base plate 30 and the pivoted end thereof. This also aids in evening the distribution of the material by the various streams which are created by said deflector vanes, whereby it has been found, as indicated above, that all of the features described above and illustrated on the drawing cooperate to produce the desired relatively even distribution of the material across the entire area of the silo as illustrated in exemplary manner by the various arrows shown in FIG. 3.

To increase the effectiveness of the silage distributor head, and particularly for purposes of rendering the silage distribution effective by the vanes 38, 40 and 42 thereof, the present invention includes additional silage directing means, details of which are shown in FIGS. 8-11. As explained hereinabove, the silage distributor head 22 is pivotally connected at one end to a bracket 24 mounted on the outer, discharge end of the curved, gooseneck shaped conduit 14. As shown particularly in FIG. 9, the conduit 14 has a slightly different configuration from that shown in FIGS. 1 and 5, the shape shown in FIG. 9 being more suitable to accommodate the silage directing means described in detail hereinafter, than the one shown in FIGS. 1 and 5.

Referring to the gooseneck shaped conduit 14 shown in FIG. 9 in particular, it will be seen that the same is wider, in side elevation as shown in FIG. 9, at the lower end of it than at the upper end. Also, as shown in FIG. 8, the gooseneck conduit 14 preferably is of an even width, said width being greater than the diameter of the fill pipe 12, for purposes to be described. The conduit 14 may be enclosed along the wall nearest the sidewall of the silo 10 or it may be open, at least along the upper portion thereof.

The details of the silage distributor head 22 which is shown in FIGS. 8 and 9 is substantially the same as that illustrated in FIGS. 1–7, both as to structure, as well as function. In order that the silage distributor head may function preferably to distribute silage evenly across substantially the entire cross-sectional area of a silo, and particularly a silo of substantial diameter, such as described hereinabove, it is essential that the stream of silage which is blown upwardly through the fill pipe 12 and along the gooseneck conduit 14 shall be substantially central with respect to the outlet end of the gooseneck conduit 14 so as to engage the various vanes of the silage distributor head 22 in a manner to insure such even, lateral and forward distribution of the silage across the entire cross-sectional area of the silo. To this end, the invention includes silage directing means 60 which, preferably, comprises a tubular section having a diameter less than the cross-sectional dimensions of the lower, inlet end of the gooseneck conduit 14. To support the same, the following structure is provided:

Support means 62 comprises a pair of vertically extending members 64 which are spaced transversely apart and the opposite ends thereof respectively are clamped suitably to the circular hoops 66, which are quite commonly provided around silos to resist bursting thereof. Preferably, therefore, the vertical members 64 are permanently connected to the sidewall of the silo. Said support means also includes a sub-frame 68 which is substantially horizontal and rectangular in plan view. It, like the vertical member 64, may be formed from angle iron and a suitable angular brace 70 is provided at each side of the subframe 68. The inner ends of the side members of the sub-frame 68, as well as the lower ends of the angular braces 70, are adapted to be vertically adjustably connected to the vertical members 64 by bolts which extend through suitable holes 72 formed in the vertical members 64 as best shown in FIG. 9.

The lower end of the gooseneck conduit 14 is firmly connected to the sub-frame 68, as shown particularly in FIG. 10. The purpose of the vertical adjustability of the sub-frame 68 with respect to the upper portion of the silo is to enable the upper, discharge end of the gooseneck conduit 14 upon which the bracket 24 is connected, to rest upon the upper end 74 of the silo 10, and thereby stabilize the same in its discharge position in which it projects through the fill opening 76 in the upper portion of the silo 10.

The horizontal sub-frame 68, as shown particularly in FIG. 10, also supports appropriate coupling means 78 by which the upper end of the fill pipe is connected to the lower, inlet end of the gooseneck conduit 14. The coupling structure also includes a short vertical collar 80, best shown in FIG. 10, which is coaxial with the upper end of the fill pipe 12 and is rigidly supported with respect thereto by the horizontal sub-frame 68. The principal purpose of the collar 80 is to support the lower end of the tubular silage directing means 60. The diameter of said directing means is slightly larger than that of the collar 80, as also is best shown in FIG. 10. The lower end of the directing means 60 is pivotally connected to the collar 80 at diametrically opposed locations by appropriate pivot pins 82. Said pins may be in the form of appropriate bolts or suitable short shafts, as desired.

The pivotal mounting of the directing means 60 is one of the major features of the present invention because it is the means by which the stream of silage being blown upwardly through the fill pipe 12 is directed axially with respect to gooseneck conduit 14 and particularly the distributor head 22. To effect desired adjustment in the position of the axis of the directing means 60 with respect to the gooseneck conduit 14 and the distributor head 22, manually operable positioning means are provided in the form of a relatively simple bar 84. The inner end thereof is pivotally connected to the upper end of the directing means 60 at one side thereof by adding appropriate means, such as a pivot bolt 86. The bar 84 extends through a suitable opening 88 in one sidewall of the gooseneck conduit 14. Adjacent said opening 14 is an appropriate bracket 90 which, in cross-section, may be either L-shaped or U-shaped, if desired. As illustrated, particularly in FIG. 11, the bracket 90 is U-shaped in cross-section and is secured to the sidewall of the gooseneck conduit 14 by a pair of bolts 92. Said bracket also has an opening which is coaxial with the opening 88 in order to accommodate the bar 84 therethrough.

The positioning bar 84 is adapted to be secured in a desired adjusted position by simple securing means which may be in the form of a pin 94 which extends through a pair of transversely aligned holes in the side flanges of the bracket 90 and also through a selected hole 96 in the bar 84. As shown in FIG. 10, a series of said holes are provided which are evenly spaced. The function of the bar 84 is to secure the axis of the silage directing means 60 in a desired position with respect to the axis of the gooseneck conduit 14 and particularly the axis of the silage distributor head 22 so that the stream of silage issuing from the discharge end of the gooseneck conduit 14 will hit the deflecting means upon the silage distributor head 22 in such manner that substantially even lateral, as well as forward distribution of the silage will be achieved by the silage distributor head 22.

As in regard to the illustrations of the silage distributor head 22 shown particularly in FIGS. 1 and 5, the function of the distributor head as illustrated in FIG. 9 also is similar. Said head is adjustable to various angular positions with respect to the discharge end of the gooseneck conduit 14. Several exemplary illustrations thereof are shown both in full lines and phantom in FIG. 9. One of said positions is the normal position used when the silo is being filled, but as the mass of silage rises in the silo to near the top, the second position is assumed to effect what is known as "topping out" the silage. Such adjustment is effected manually by climbing up an appropriate ladder, not shown, but normally provided along the sidewall of the silo.

While the invention has been described and illustrated in its several perferred embodiments, it should be understood that the invention is not to be limited to the precise details herein illustrated and described since the same may be carried out in other ways falling within the scope of the invention as illustrated and described.

We claim:

1. A silage distributor head connectable to the outer end of a gooseneck shaped conduit of a fill pipe for a silo to produce substantially level distribution of silage across the entire cross-sectional area of a silo and comprising in combination, a bracket connectable to said outer end of a gooseneck shaped conduit of the fill pipe for a silo, a substantially flat base plate pivotally connected at one end to said bracket, a first pair of outermost deflector vanes connected along one edge to said base plate and extending substantially from the pivoted end of said plate in slightly diverging relationship to each other, said vanes being curved outwardly from each other about midway of the length of said base plate, a second pair of deflector vanes smaller than said first pair each connected along one edge to said base plate in spaced relationship to each other and extending from approximately midway of the length of said plate respectively in inwardly spaced relationship to said vanes of said first pair of vanes and curving outwardly away from each other, the outer ends of said second pair of vanes being substantially adjacent the outer end of said base plate, a central deflector of substantially uniform width connected at one end to the outer end of said base plate intermediately of the opposite sides thereof and parallel thereto, said central deflector curving downwardly in use from the plane of said base plate with the outer end of said deflector being substantially transverse to the plane of said base plate and the width of said deflector being substantially less than the space between the outer ends of said second pair of deflector vanes, whereby substantially seven streams of silage material are divided from a single stream delivered from said gooseneck shaped conduit, said streams respectively comprising a stream extending along each of the outer surfaces of said first pair of deflector vanes, a stream extending between each pair of said first and second deflector vanes, a stream extending between each of said second pair of deflector vanes and the edges of said central deflector, and a stream deflected downwardly from said central deflector, and transversely adjustable means on said central deflector operable to vary the effective width thereof and thereby correspondingly vary the width of the streams discharging respectively between said deflector and the second pair of deflector vanes and the stream discharging downwardly from said central deflector.

2. The distributor head according to claim 1 in which said transversely adjustable means for said central deflector comprises a pair of extension plates curved similarly to said central deflector and slidable transversely in opposite directions relative to said deflector and each other to dispose the outer edges of said plates at adjustable distances relative to the outer edges of said deflector to vary the overall width of the latter, said plates having transversely extending slots therein and clamping bolts extending through said delfector and slots of said plates to secure the same in desired adjusted positions.

3. A silage distributor system for the upper portion of a silo attachable to the upper end of the vertical fill pipe for a silo, said distributor system comprising in combination, support means attachable to the upper portion of the wall of a silo, a curved gooseneck shaped conduit connectable to said support means and one end thereof being supported adjacent the upper end of a fill pipe for said silo to receive silage therefrom, the opposite end of said conduit comprising the discharge end and extending upwardly from said support means and into a fill opening in the upper portion of a silo, a silage distributing head adjustably connected to said discharge end of said conduit and adapted to extend therefrom into said upper portion of a silo and having vanes thereon directed outwardly from opposite sides of the central axis of said head and adapted when silage is projected therealong from said conduit to deflect the same in opposite lateral directions of said central axis and forwardly therefrom to provide distribution of silage across the area of a silo, a tubular silage directing member positioned substantially within said one end of said curved gooseneck shaped conduit and extending around the axis of said fill pipe, and means adjacent the upper end of said fill pipe supporting said tubular silage directing member for substantially lateral adjustable movement thereof relative to said upper end of said fill pipe and said one end of said conduit and thereby being adapted to direct the discharge of silage toward said distributing head accurately in a manner to effect substantially even distribution of silage laterally in substantially all directions outwardly from said distributing head into a silo to afford substantially even compacting of silage therein.

4. The silage distributor according to claim 3 in which said support means comprises a frame unit including vertical means attachable to the sidewall of a silo for support thereby, and a substantially horizontal sub-frame engaging the lower end of said gooseneck conduit to support the same, and means adjustably connecting said sub-frame to said vertical means for limited vertically adjustable support of said gooseneck conduit relative to the fill opening in the upper portion of a silo independently of any other support means.

5. The silage distributor according to claim 3 in which said silage directing member is supported for lateral movement relative to the axis of the upper end of said fill pipe to direct a stream of silage into said gooseneck conduit in the foresaid manner.

6. The silage distributor according to claim 5 in which said tubular silage directing means is adapted to be mounted substantially coaxially of said upper end of said fill pipe, and said distributor further including means pivotally interconnecting the lower end of said tubular directing means relative to said fill pipe.

7. The silage distributor according to claim 5 in which said silage directing means is a tubular section, and said distributor further including means pivotally connecting the lower end of said tubular section to said support means substantially coaxially relative to said fill pipe, and positioning means connected to said tubular section and adapted to move the upper end thereof laterally and maintain the same in a desired adjusted position to direct silage therethrough and to said gooseneck conduit and distrubutor head in the aforesaid manner.

8. The silage distributor according to claim 7 in which said positioning means comprises a bar pivotally connected to one side of said tubular section adjacent the upper end thereof and projecting laterally relative to one side of said gooseneck conduit, and securing means engaging said bar to maintain said tubular section in a desired adjusted position relative to said conduit and silage distributor head.

* * * * *